United States Patent
Imai et al.

(10) Patent No.: US 8,970,484 B2
(45) Date of Patent: Mar. 3, 2015

(54) THREE DIMENSIONAL DISPLAY DEVICE AND THREE DIMENSIONAL DISPLAY METHOD

(75) Inventors: Hiroshi Imai, Tokyo (JP); Nobuaki Takanashi, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 228 days.

(21) Appl. No.: 13/809,326

(22) PCT Filed: May 31, 2011

(86) PCT No.: PCT/JP2011/062452
§ 371 (c)(1),
(2), (4) Date: Jan. 9, 2013

(87) PCT Pub. No.: WO2012/011321
PCT Pub. Date: Jan. 26, 2012

(65) Prior Publication Data
US 2013/0120247 A1 May 16, 2013

(30) Foreign Application Priority Data

Jul. 23, 2010 (JP) ................. 2010-165997

(51) Int. Cl.
| G09G 5/00 | (2006.01) |
| G06F 3/01 | (2006.01) |
| G02B 27/22 | (2006.01) |
| G03B 35/18 | (2006.01) |
| G03B 35/24 | (2006.01) |

(Continued)

(52) U.S. Cl.
CPC .............. *G06F 3/01* (2013.01); *G02B 27/2214* (2013.01); *G03B 35/18* (2013.01); *G03B 35/24* (2013.01); *G03B 42/06* (2013.01); *H04N 13/0404* (2013.01)
USPC .......................................... 345/156; 348/163

(58) Field of Classification Search
USPC ................. 345/156–179; 348/40, 42, 46, 163
See application file for complete search history.

(56) References Cited

U.S. PATENT DOCUMENTS

| 6,808,268 B2 | 10/2004 | Vrachan et al. |
| 2012/0257018 A1* | 10/2012 | Shigemura et al. ............. 348/46 |

FOREIGN PATENT DOCUMENTS

| JP | 2000047563 A | 2/2000 |
| JP | 2003029898 A | 1/2003 |
| JP | 2005070843 A | 3/2005 |
| JP | 2008129835 A | 6/2008 |

OTHER PUBLICATIONS

Takayuki Hoshi, Masafumi Takahashi, Takuyuki Iwamoto, and Horoyuki Shinoda; "Noncontact Tactile Display Based on Radiation Pressure of Airborne Ultrasound"; Jul.-Sep. 2010; IEEE CS, RAS, & CES; vol. 3; pp. 155-165.*

(Continued)

*Primary Examiner* — Premal Patel
(74) *Attorney, Agent, or Firm* — Sughrue Mion, PLLC (57) ABSTRACT

Provided is a three dimensional display device that includes: three dimensional image display unit (1) having display surface (11) for spatially separating and displaying parallax images corresponding to at least two viewpoints; and force sense generation unit (2) configured to generate a sound wave toward display surface (11) of three dimensional display unit (1) and then generate predetermined pressure of the sound wave reflected on display surface (11) at a position spatially similar to the position of three dimensional image (8) displayed by three dimensional display unit (1).

10 Claims, 11 Drawing Sheets

(51) Int. Cl.
*G03B 42/06* (2006.01)
*H04N 13/04* (2006.01)

(56) References Cited

OTHER PUBLICATIONS

Takayuki Hoshi, Daisu Abe, and Hiroyki Shinoda; "Adding Tactile Reaction to Hologram"; Sep. 27-Oct. 2, 2009; Robot and Human Interactive Communication; pp. 7-11.*

The international search report for PCT/JP2011/062452 mailed on Aug. 16, 2011.
"Three dimensional image engineering", by Okoshi Takanori, Asakura Publishing Co., Ltd., Jul. 10, 1991.
"Touchable Holography", Full Conference DVD-ROM, Disc 1, ACM SIGGRAPH 2009: Emerging Technologies, New Orleans, Aug. 3-7, 2009.
Yasutoshi Makino et al., "Dai 51 Kai Keywords you should know", The Journal of the Institute of Image Information and Television Engineers, Apr. 1, 2010, vol. 64, No. 4, pp. 502 to 504.

* cited by examiner

THREE DIMENSIONAL DISPLAY DEVICE AND THREE DIMENSIONAL DISPLAY METHOD

This application is a National Stage Entry of PCT/JP2011/062,452 filed May 31, 2011, which claims priority from Japanese Patent Application 2010-165997 filed Jul. 23, 2010, the disclosures of all of which are incorporated by reference herein, in their entirety.

TECHNICAL FIELD

The present invention relates to a three dimensional display device and a three dimensional display method for presenting a three dimensional image to an observer and providing a force sense corresponding to the reproduced position of the three dimensional image shown to the observer.

BACKGROUND ART

Recently, more and more three dimensional display devices concerning a flat panel display such as a liquid crystal panel have been offered. Regarding three dimensional display devices using flat panel display, a focus of attention has been on a three dimensional display device that achieves three dimensional viewing by spatially separating and displaying a plurality of images having both-eye parallax on left and right eyes using a lenticular lens or a parallax barrier. This device is advantageous in that an observer does not need any special glasses to view a three dimensional image (e.g., refer to Nonpatent Literature 1).

There has also been offered a pseudo three dimensional display device that uses a tactile display including an image display unit and an aerial ultrasonic phased array (refer to Nonpatent Literature 2). The three dimensional display device described in Nonpatent Literature 2 uses an image display device described in Patent Literature 1 as the image display unit for displaying a pseudo three dimensional image.

Figure 1:
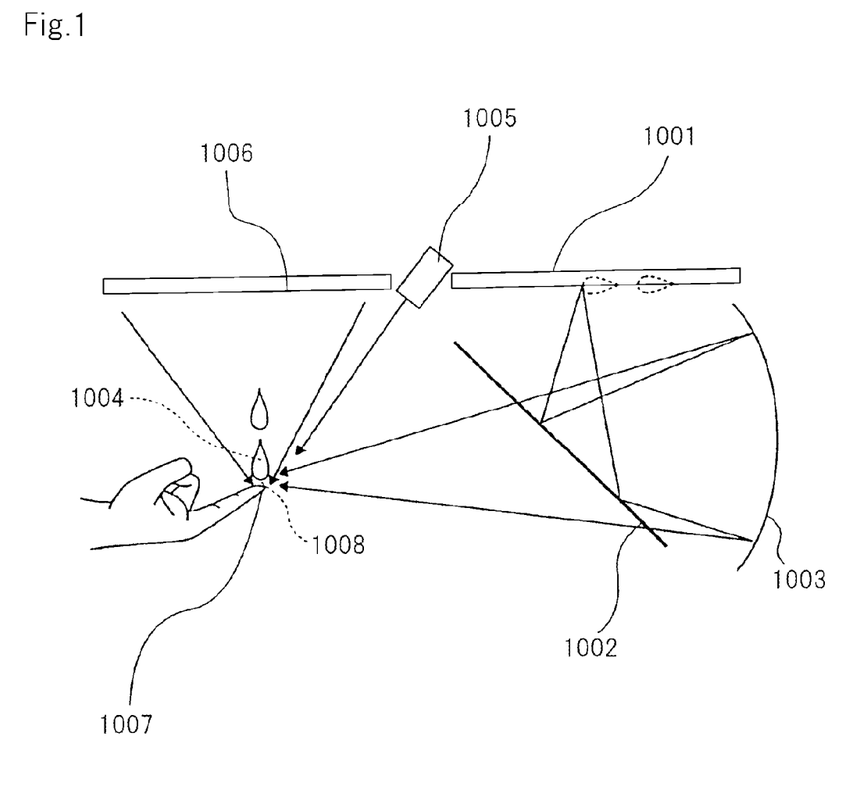
[Fig. 1] An explanatory schematic view showing a three dimensional display device related to the present invention.

FIG. 1 is a schematic view showing the configuration of a three dimensional display device related to the present invention. As shown in FIG. 1, light emitted from image display unit 1001 is reflected by half mirror 1002. Then, an image is formed on concave mirror 1003, and aerial optical image 1004 is formed as a pseudo three dimensional image. In this case, fingertip position 1007 of the observer is detected by finger position sensor 1005, an image displayed on image display unit 1001 is updated according to fingertip position 1007 detected by finger position sensor 1005, and ultrasonic image 1008 from ultrasonic actuator array 1006 is provided in synchronization with aerial optical image 1004. This enables the observer to have an experience in which a visual sensation and a tactile sensation are combined without wearing any special devices.

CITATION LIST

Patent Literature 1: U.S. Pat. No. 6,808,268
Nonpatent Literature 1: "Three dimensional image engineering", by Okoshi Takanori, Asakura Publishing Co., Ltd., Jul. 10, 1991
Nonpatent Literature 2: "Touchable Holography", Full Conference DVD-ROM, Disc 1, ACM SIGGRAPH 2009: Emerging Technologies, New Orleans, 3-7 Aug., 2009

SUMMARY OF INVENTION

Problems to be Solved by Invention

However, in the three dimensional display device related to the present invention, an ultrasonic wave generation space for generating the ultrasonic image by the ultrasonic actuator array and an aerial image generation space for generating the aerial optical image are independently arranged side by side, creating a problem in which the entire three dimensional display device is enlarged.

In the three dimensional display device related to the present invention, since the force sense is generated by the ultrasonic wave propagated from the ultrasonic actuator array disposed above the aerial optical image, a sensation cannot be provided by an ultrasonic wave propagated from the depth direction of the aerial optical image. This creates a problem, that is, when the aerial optical image is pushed by the fingertip, the force sense cannot be reproduced in a direction parallel to the moving direction (depth direction of the aerial optical image) of the fingertip of the aerial optical image.

Further, the image display unit of the three dimensional display device related to the present invention displays the pseudo three dimensional image reproducing the aerial optical image. Consequently, the image display unit cannot carry out three dimensional displaying in which a three dimensional image reproduction position cannot be arbitrarily changed in the depth direction of the three dimensional image according to the moving instruction of the observer's fingertip or the like for pushing in the aerial optical image, creating a problem of limiting the application of the three dimensional display device.

It is therefore an object of the present invention to provide, for solving the aforementioned problems, a three dimensional display device that can be miniaturized as a whole and that can provide a force sense in the depth direction of a three dimensional image, and a three dimensional display method.

Solution to Problem

To achieve the object, a three dimensional display device according to the present invention, includes: a three dimensional image display unit having a display surface for spatially separating and displaying parallax images corresponding to at least two viewpoints; and a force sense generation unit configured to generate a sound wave toward the display surface of the three dimensional display unit and then generate predetermined pressure of the sound wave reflected on the display surface at a position spatially similar to a position of a three dimensional image displayed by the three dimensional display unit.

A three dimensional display method according to the present invention displays a three dimensional image by spatially separating parallax images corresponding to at least two viewpoints, reflects a sound wave on a display surface for displaying the parallax images, and propagates the sound wave to a position spatially similar to the position of the three dimensional image to generate a force sense.

Effects of Invention

According to the present invention, since an ultrasonic wave image generation space which is produced by the force sense generation unit and a three dimensional image generation space which is generated by the three dimensional image display unit overlap each other at the same position, the entire three dimensional display device can be miniaturized. Further, the present invention can provide a force sense in the depth direction of the three dimensional image with respect to a tactile sense portion such as an observer's finger or the like.

DESCRIPTION OF EMBODIMENTS

Hereinafter, the embodiments of the present invention will be described with reference to the drawings. Components having similar functions will be denoted by similar reference numerals, and description thereof will be omitted.

(First Embodiment)

Figure 2:
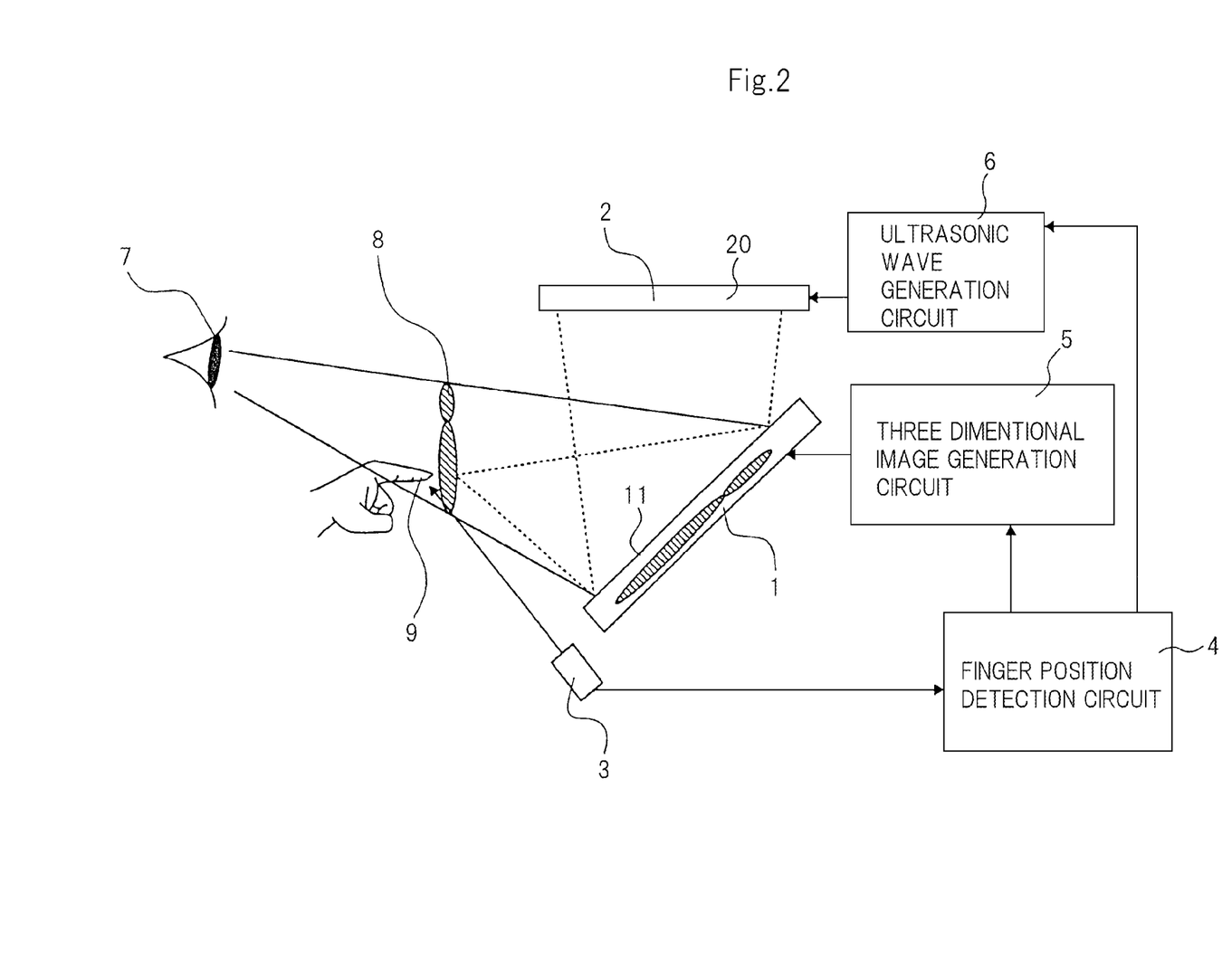
[Fig. 2] An explanatory schematic view showing a three dimensional display device according to a first embodiment.

FIG. 2 is an explanatory schematic view showing a three dimensional display device according to a first embodiment. As shown in FIG. 2, the three dimensional display device according to the first embodiment includes: three dimensional image display unit 1 having display surface 11 for spatially separating and displaying parallax images corresponding to at least two viewpoints; and force sense generation unit configured to generate a sound wave toward display surface 11 of three dimensional display unit 1 and then generate predetermined pressure of the sound wave reflected on display surface 11 at a position spatially similar to the position of three dimensional image 8 displayed by three dimensional display unit 1. The position of three dimensional image 8 indicates a position (reproduction position) in which three dimensional image 8 is sensed and which is away from display surface 11 of three dimensional image display unit 1.

The three dimensional display device further includes finger position sensor 3 and finger position detection circuit 4 serving as position detection device for detecting fingertip position 9 which is the observer's tactile site at which a finger senses three dimensional image 8, three dimensional image generation circuit 5 for generating a parallax image displayed on three dimensional image display unit 1, and ultrasonic wave generation circuit 6 for generating an ultrasonic wave from force sense generation circuit 2.

Three dimensional image display unit 1 displays three dimensional image 8 corresponding to observer's viewpoint position 7 on a display surface. Observer's fingertip position 9 is measured by finger position sensor 3, and detected by finger position detection circuit 4 based on the measured result.

Force sense generation unit 2 includes ultrasonic actuator array 20 having a generation region for generating an ultrasonic wave toward display surface 11 of three dimensional image display unit 1 and propagating the ultrasonic wave reflected on display surface 11 in parallel with the depth direction of three dimensional image 8. Ultrasonic actuator array 20 converges the ultrasonic wave on fingertip position 9 detected by finger position detection circuit 4, and provides a force sense stimulus to observer's fingertip position 9. Three dimensional image generation circuit 5 updates three dimensional image 8 according to fingertip position 9. The ultrasonic wave generated from ultrasonic actuator array 20 is regularly reflected on display surface 11 of three dimensional image display unit 1 to be propagated in parallel with the depth direction of three dimensional image 8.

Figure 3:
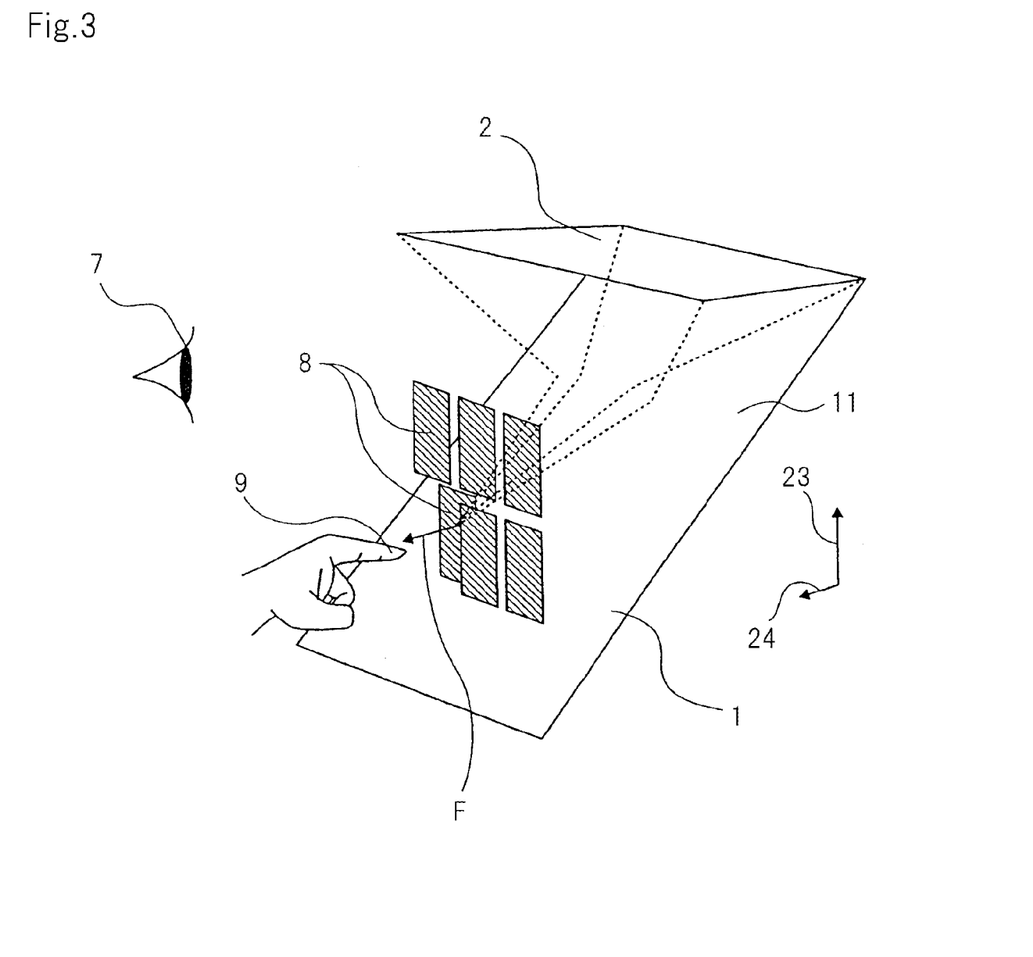
[Fig. 3] An explanatory schematic view showing the depth direction of a three dimensional image and a direction in which force sense is provided according to the first embodiment.

FIG. 3 is a perspective view showing the three dimensional display device according to the first embodiment. As shown in FIG. 3, three dimensional image 8 is observed as an image erected in vertical direction 23 from observer's viewpoint position 7. A force sense stimulus F generated from ultrasonic actuator array 20 is provided to the portion of three dimensional image 8 equivalent to fingertip position 9 in depth direction 24. Then, the image of the portion of three dimensional image equivalent to fingertip position 9 is updated. In an example shown in FIG. 3, concerning three dimensional image 8 reproducing a plurality of buttons, three dimensional image 8 of a button, which is pressed, moves in a button pressing direction, and the force sense stimulus F when the button is pressed is provided to fingertip position 9 in a direction opposite the pressing direction.

As an image display element which comprises three dimensional image display unit 1, a color liquid crystal panel having 1280 pixels in a horizontal direction and 960 pixels in a perpendicular direction and a screen size of 300 mm in the horizontal direction and 200 mm in the perpendicular direction is used. In the color liquid crystal panel, the pixels of red, blue and green are arrayed in the perpendicular direction, and a set of these constitutes one pixel (about 235 μm×about 235 μm).

Figure 6:
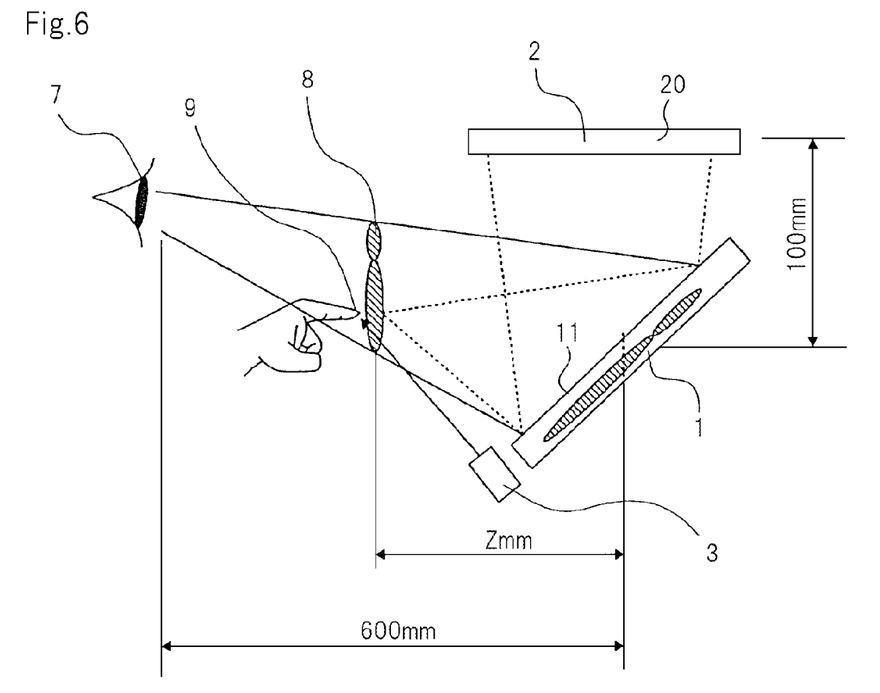
[Fig. 6] An explanatory schematic view showing a relationship between a three dimensional image reproduction position and an ultrasonic image reproduction position according to the first embodiment.

A lenticular lens is made of a polycarbonate resin. The lenticular lens uses an array of 640 cylindrical lenses, and a lens pitch is set to about 470 μm. In the lenticular lens, as shown in FIG. 6, an optimal viewpoint is set at a position of 600 mm from the center of the display surface in the depth direction of three dimensional image 8, and a focal distance is set.

Figure 4:
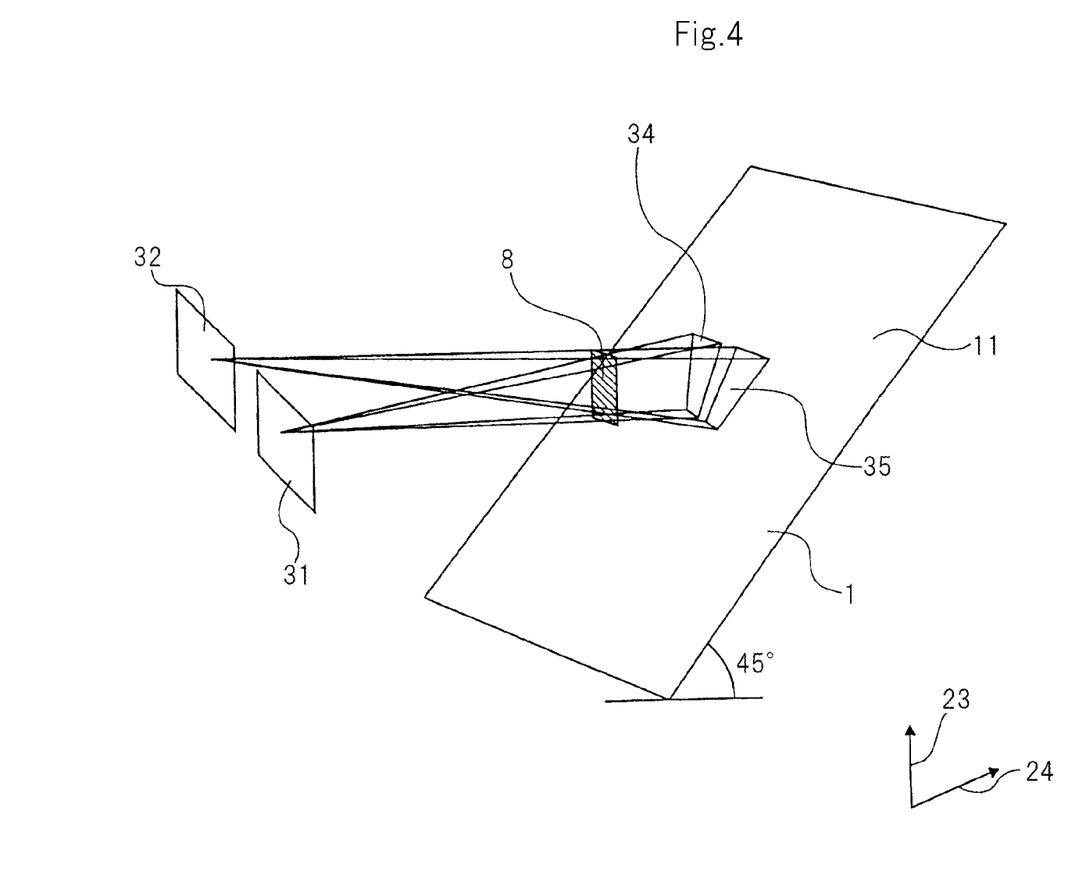
[Fig. 4] A schematic view showing the display state of the three dimensional image according to the first embodiment.

FIG. 4 is an explanatory schematic view showing the processing of three dimensional image generation circuit 5 according to the first embodiment. As shown in FIG. 4, three dimensional image generation circuit 5 includes a digital image processing circuit (not shown) as image processing device for generating perspective projection images to display surface 11 when right eye viewpoint 31 and left eye viewpoint 32 of desired three dimensional image 8 to be displayed are perspective centers. The digital image processing circuit transforms a parallax image in a perspective projection manner according to the position of each of a plurality of image display elements.

In an example shown in FIG. 4, display surface 11 of three dimensional image display unit 1 is inclined at an angle of 45° in the horizontal direction.

As shown in FIG. 4, perspective projection transformed image for right eye 34 and perspective projection transformed image for left eye 35 respectively corresponding to right eye viewpoint 31 and left eye viewpoint 32 are alternately arranged for each pixel in the horizontal direction by three dimensional image generation circuit 5, transformed into images to be three-dimensionally viewed by the lenticular lens, and then displayed on the color liquid crystal display panel that is an image display element.

Under this condition, images respectively corresponding to observer's right eye viewpoint 31 and left eye viewpoint 32 are optically and independently provided by the lenticular lens. Then, as shown in FIG. 3, three dimensional image 8 is observed erected at viewpoint position 7 in vertical direction 23.

The use of the lenticular lens for three dimensional image display unit 1 enables the observer to view the image three-dimensionally by the naked eyes without wearing any special glasses.

Figure 5A:
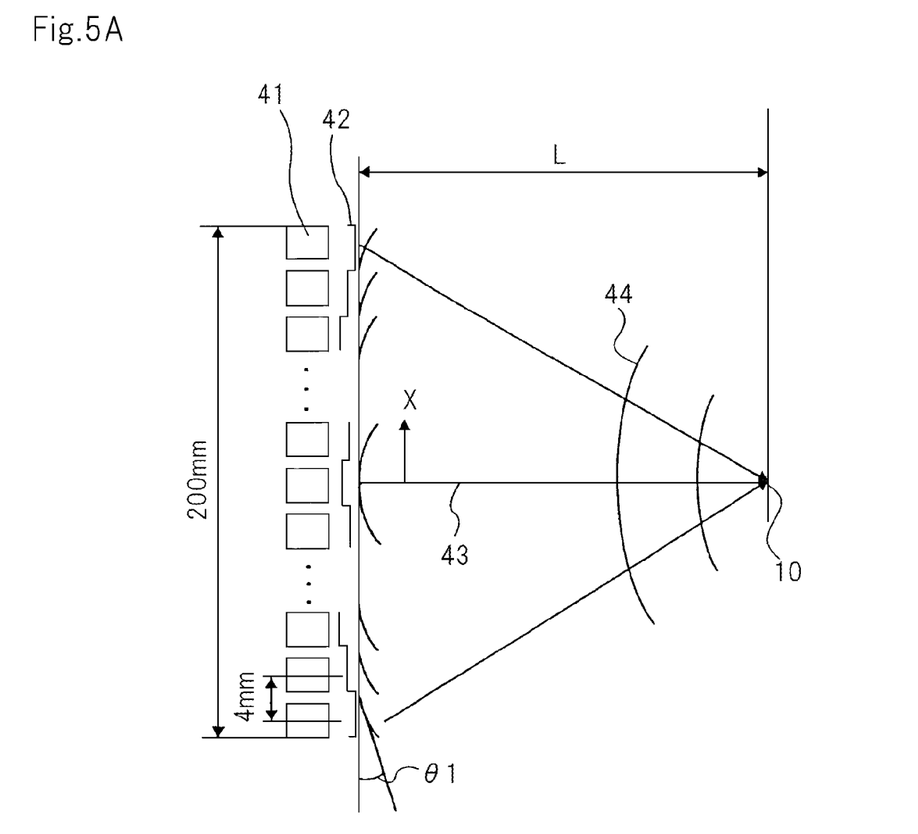
[Fig. 5A] An explanatory schematic view showing the operation principle of an ultrasonic actuator according to the first embodiment.
Figure 5B:
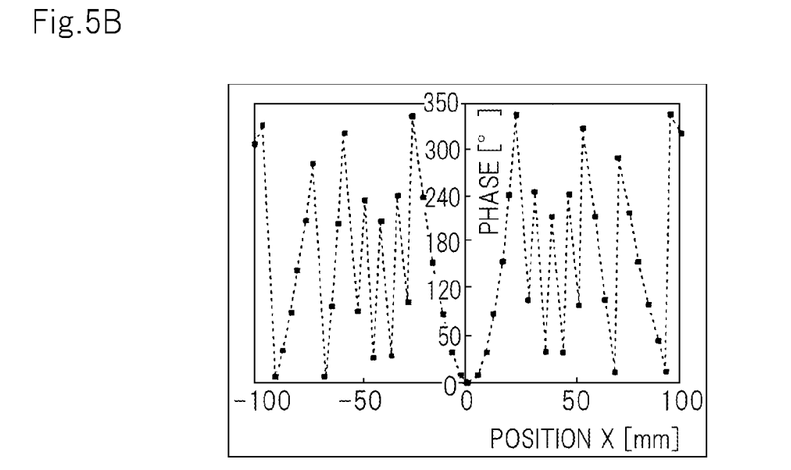
[Fig. 5B] An explanatory schematic view showing the operation principle of the ultrasonic actuator according to the first embodiment.
Figure 5C:
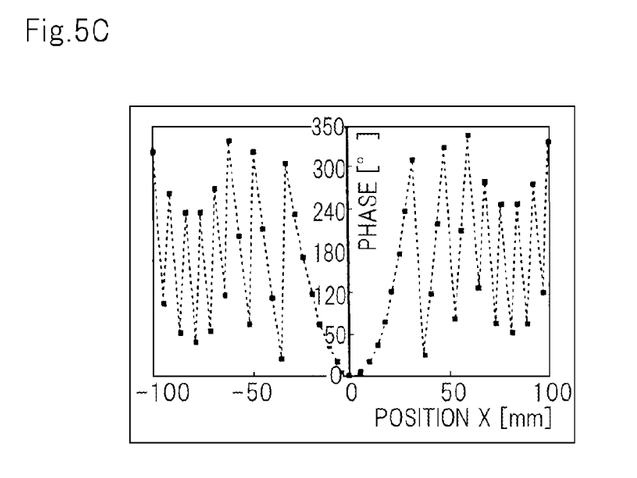
[Fig. 5C] An explanatory schematic view showing the operation principle of the ultrasonic actuator according to the first embodiment.

FIGS. 5A to 5C are explanatory views showing the operation principle of ultrasonic actuator array 20 according to the first embodiment shown in FIG. 2. FIG. 5A is a sectional view of ultrasonic actuator array 20 in a one dimensional direction. FIG. 5B shows a phase distribution when the convergent distance of the ultrasonic wave is 150 mm. FIG. 5C shows a phase distribution when the convergent distance of the ultrasonic wave is 300 mm.

As shown in FIG. 5A, ultrasonic actuator array 20 includes 50×50 actuators 41 arranged at pitches of 4 mm on a plane. Each actuator 41, which includes a control circuit configured to freely control the pressure amplitude and the phase of the ultrasonic wave generated by ultrasonic wave generation circuit 6, can provide arbitrary phase distribution 42.

Under the condition of the configuration shown in FIG. 5A, assuming that $\phi(°)$ is the phase of actuator 41, p is the pitch of actuator 41, $\theta 1$ is a wave front angle, L is a focusing distance, and X is a distance in a direction perpendicular to the axial direction of center axis 43, relationships of these variables are presented by the following formulas (1) and (2):

$$\phi = 360° \cdot x \cdot \sin \theta 1 / \lambda \quad \text{(formula 1)}$$

$$x/L = \tan \theta 1 \quad \text{(formula 2)}$$

When the frequency of the ultrasonic wave is 85 kHz, a wavelength $\lambda$ in air is 4 mm (in the case of sound velocity of 340 m/s). When the pitch p of actuators 41 is 4 mm, the number of actuators 41 is 50×50, and the entire size of ultrasonic actuator array 20 is 200 mm×200 mm, for example, in the case of focusing distances of 150 mm and 300 mm, phase distributions shown in FIGS. 5B and 5C are provided. Convergent wave front 44 is accordingly propagated toward a desired point where three dimensional image 8 is formed by three dimensional image display unit 1 to enable generation of a converged ultrasonic wave. As a result, the ultrasonic wave position can be changed by changing the phase distribution for driving each actuator 41.

As shown in FIG. 5A, in the first embodiment, the ultrasonic wave generated from actuator 41 is reflected on the surface of the lenticular lens constituting display surface 11 of three dimensional image display unit 1. In this case, since the polycarbonate resin of the lenticular lens has acoustic impedance larger than that of air, the ultrasonic wave is totally reflected on display surface 11. The ultrasonic wave totally reflected on display surface 11 forms ultrasonic image 10 in a direction similar to the depth direction of displayed three dimensional image 8. For example, by modulating a carrier wave with a rectangular wave at a frequency of 100 Hz, a force sense stimulus F can be provided by vibration stimulation.

The generation of the one dimensional converged ultrasonic wave has been described. A two dimensional converged ultrasonic wave can similarly be generated according to sound wave diffraction law (Hyugens Fresnel principle). Further, for a complex wave front, the phase distribution or the amplitude distribution can be provided according to general Fourier acoustic theory (e.g., refer to Fourier Acoustics, by E. G. Williams, Springer-Verlag Tokyo).

FIG. 6 shows a relationship between a three dimensional image reproduction position and an ultrasonic image reproduction position according to the first embodiment. As shown in FIG. 6, when the center axis of ultrasonic actuator array 20 intersects the center of display surface 11 of three dimensional image display unit 1, the distance between the centers is 100 mm, and when a three dimensional image reproduction position is set to distance Z mm from display surface 11 of three dimensional display unit 1, the ultrasonic image reproduction position only needs to be set to Z mm+100 mm. For example, in the case of sensing, by the fingertip, the pressing of the button where fingertip position 9 acquired by finger position sensor 3 is located 200 mm from the center of display surface 11 of three dimensional image display unit 1, as a first fingertip position, the position of the ultrasonic image reproduction is 200 mm+100 mm=300 mm. Thus, the phase distribution shown in FIG. 5C is provided to ultrasonic actuator array 20 to apply a force sense stimulus F to the fingertip.

In the case of sensing that fingertip is touching a three dimensional image, even where the fingertip moves to three dimensional image display unit 1 side, as a second fingertip position, the three dimensional image reproduction position is changed from 200 mm to 50 mm, and the ultrasonic image reproduction position is changed to 50 mm+100 mm=150 mm. Then, the phase distribution shown in FIG. 5B is provided to ultrasonic actuator array 20 to apply a force sense stimulus F to the three dimensional image reproduction position. Based on such a principle, the exemplary configuration shown in FIG. 3 is operated.

By providing the force sense so that pressure supply strength can be larger when the fingertip reaches the second fingertip position than first pressure supply strength provided when the fingertip reaches the first fingertip position, the sensation that the push button was fully pushed down to the bottom can be provided.

In the first embodiment, finger position sensor 3 carries out triangulation by stereo image measurement. Various optical elements for distance measurement or the like that use a blocking detection light, or a distance measurement element which uses an ultrasonic wave, can be used as finger position sensor 3. In the case of using the optical element for emitting measurement light, light avoiding a visible light region is used as measurement light, or light modulated by a frequency different from an update frequency (refresh rate) for displaying on three dimensional image display unit 1 is used. In the case of using the ultrasonic wave, the ultrasonic wave is set to a frequency different from that of the ultrasonic wave for providing the force sense.

Figure 7A:
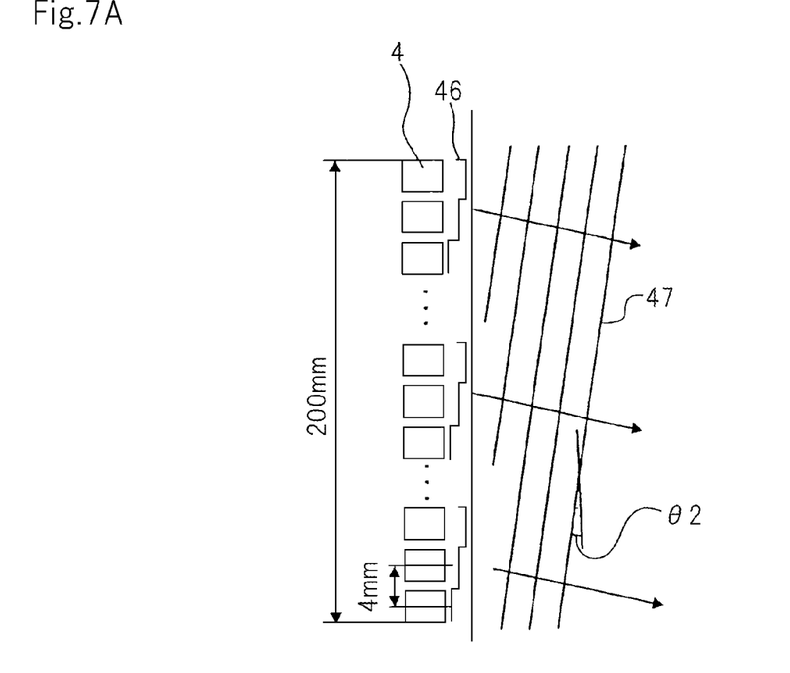
[Fig. 7A] A schematic view showing an ultrasonic image generated by the ultrasonic actuator according to the first embodiment.

FIGS. 7A to 7D are explanatory schematic views showing the generation operation of an inclined wave front by ultrasonic actuator array 20 according to the first embodiment. As shown in FIG. 7A, a wave front angle θ2 is calculated by using the formulas (1) and (2) as in the case of the converged ultrasonic wave. Then, by providing a phase difference according to the wave front angle θ2, inclined wave front 47 can be generated. In this case, the phase difference between actuators 41 of ultrasonic actuator array 20 is constant.

Figure 7B:
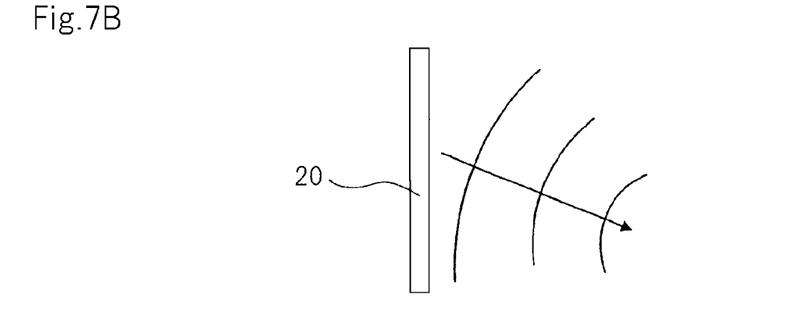
[Fig. 7B] A schematic view showing the ultrasonic image generated by the ultrasonic actuator according to the first embodiment.
Figure 7C:
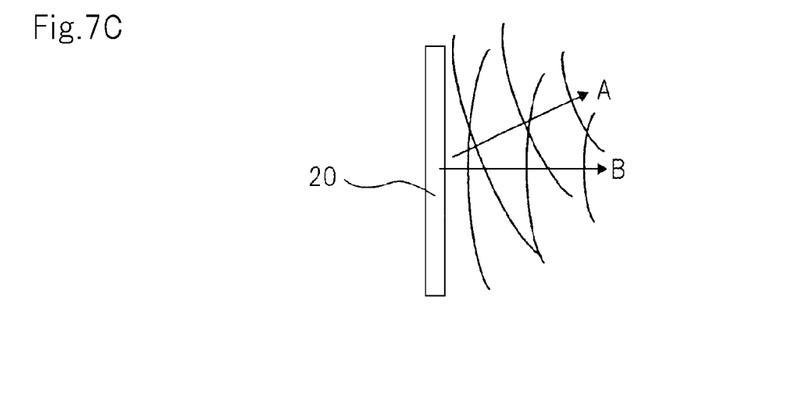
[Fig. 7C] A schematic view showing the ultrasonic image generated by the ultrasonic actuator according to the first embodiment.
Figure 7D:
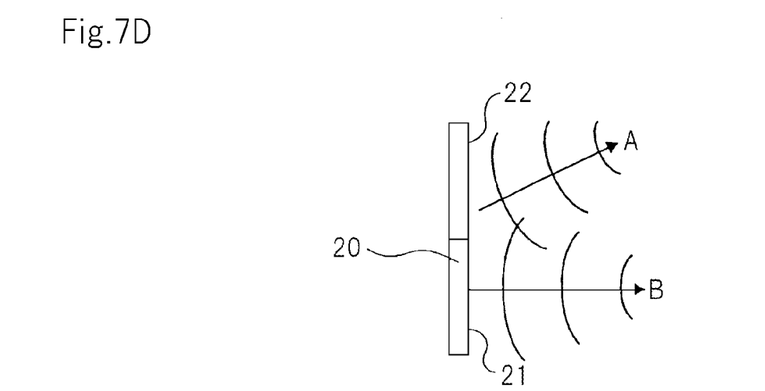
[Fig. 7D] A schematic view showing the ultrasonic image generated by the ultrasonic actuator according to the first embodiment.

By superimposing the phase distribution shown in FIG. 5A or 5B on phase distribution 46 shown in FIG. 7A, a converged spherical wave having directionality shown in FIG. 7B can be reproduced. By further superimposing the phase distribution of a converged spherical wave having a different inclined wave front, a plurality of ultrasonic wave images A and B shown in FIG. 7C can be generated. Further, as shown in FIG. 7D, the three dimensional display device can be configured such that the generation region of ultrasonic actuator array 20 is divided into a plurality of generation regions 21 and 22, a plurality of ultrasonic images A and B different from each other in propagation direction is generated from the plurality of generation regions 21 and 22, and the plurality of generation regions 21 and 22 reproduce different wave fronts.

The pitch of the lenticular lens constituting display surface 11 of three dimensional image display unit 1 is about 470 μm, which is smaller than the wavelength 4 mm of the ultrasonic wave. Thus, the convex surface of the lens group of the lenticular lens can be substantially planar with respect to the ultrasonic wave. When necessary, the flatness of an ultrasonic wave reflection surface can be increased by optically disposing a transparent glass or a resin flat plate on display surface 11 of three dimensional image display unit 1.

As an optical system for carrying out three dimensional displaying, for example, a parallax barrier, an integral photography lens array, or a pinhole array can be used, and viewpoint positions can be two or more.

As the image display device, in addition to the color liquid crystal panel, various flat display panels such as an organic EL panel, a plasma display panel, a field emission display panel, and electronic paper can be used. As the image display element, a panel larger in number of pixels and screen size than that described above can be used.

The size of the ultrasonic actuator array, the pitch of the actuators, and the frequency are not limited to those of this embodiment. They can be appropriately changed when necessary.

Thus, according to the first embodiment, since the ultrasonic image generation space where is produced by force sense generation unit 2 and the three dimensional image generation space for generating three dimensional image 8 which is generated by three dimensional image display unit 1 spatially overlap each other at the same position, the entire three dimensional display device can be miniaturized. According to the first embodiment, the force sense can be provided to the observer's fingertip or the like by the ultrasonic wave in the depth direction of three dimensional image 8. Further, according to the first embodiment, the reproduction position of three dimensional image 8 can be changed in the depth direction of three dimensional image 8 according to the observer's fingertip movement, and an interactive application can be widely used.

Hereinafter, the other embodiments will be described referring to the drawings. Only some of the components of the other embodiments are different from those of the first embodiment. Thus, the components similar to those of the first embodiment will be denoted by similar reference numerals, and description thereof will be omitted.

(Second Embodiment)

Figure 8A:
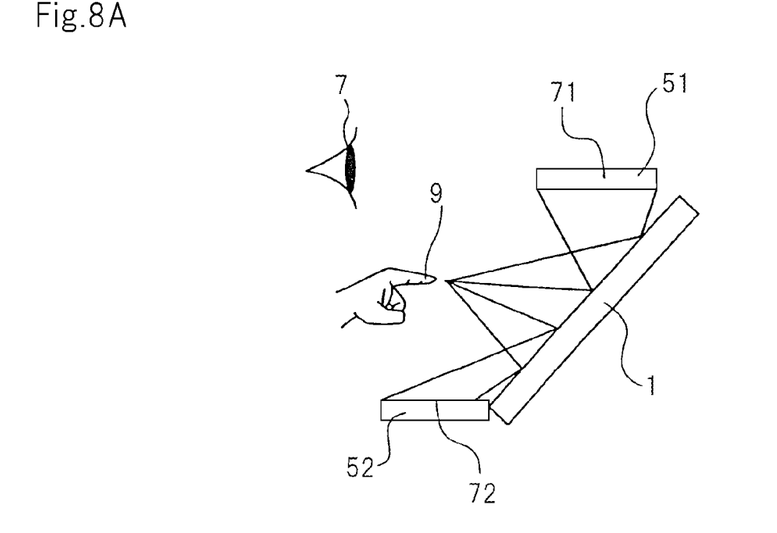
[Fig. 8A] A schematic view showing a three dimensional display device according to a second embodiment.

FIGS. 8A to 8D are schematic views showing a three dimensional display device according to a second embodiment. As shown in FIG. 8A, the three dimensional display device according to the second embodiment includes a pair of first force sense generation unit 51 and second force sense generation unit 52 arranged by sandwiching display surface 11 of three dimensional image display unit 1.

As in the case of the first embodiment, the three dimensional display device according to the second embodiment includes finger position sensor 3, finger position detection circuit 4, three dimensional image generation circuit 5, and ultrasonic wave generation circuit 6, which are not shown because they are similar to those of the first embodiment.

First force sense generation circuit 51 includes first ultrasonic actuator array 71. First ultrasonic actuator array 71 is disposed along upper one side of display surface 11 of three dimensional image display unit 1. Similarly, second force sense generation circuit 52 includes second ultrasonic actuator array 72. Second ultrasonic actuator array 72 is disposed along the lower bottom side of display surface 11 of three dimensional image display unit 1.

In the second embodiment, the horizontal sizes of ultrasonic actuator arrays 71 and 72 are ½ of the size of ultrasonic actuator array 20 of the first embodiment. The number of actuators 75 included in ultrasonic actuator arrays 71 and 72 is 50×25, and the entire sizes of ultrasonic actuator arrays 71 and 72 are 100 mm×200 mm. A phase distribution (opening range of ultrasonic actuator array 71) similar to that of the first embodiment is provided to ultrasonic actuator array 71, an ultrasonic wave is reflected on display surface 11 of three dimensional image display unit 1, and an ultrasonic image is reproduced at fingertip position 9.

A phase distribution shown in FIG. 7B where the phase distribution of a converged spherical wave having an inclined wave front shown in FIG. 7A superimposed is provided to second ultrasonic actuator array 72 disposed on the bottom side of three dimensional image display unit 1. By setting the wave front angle θ2 of inclined wave front 47 to 45° or higher, an ultrasonic wave generated from ultrasonic actuator array 72 is reflected on display surface 11 of three dimensional image display unit 1 to reach fingertip position 9, and force sense stimuli F provided in the opposite direction from the observer side can be increased.

Figure 8B:
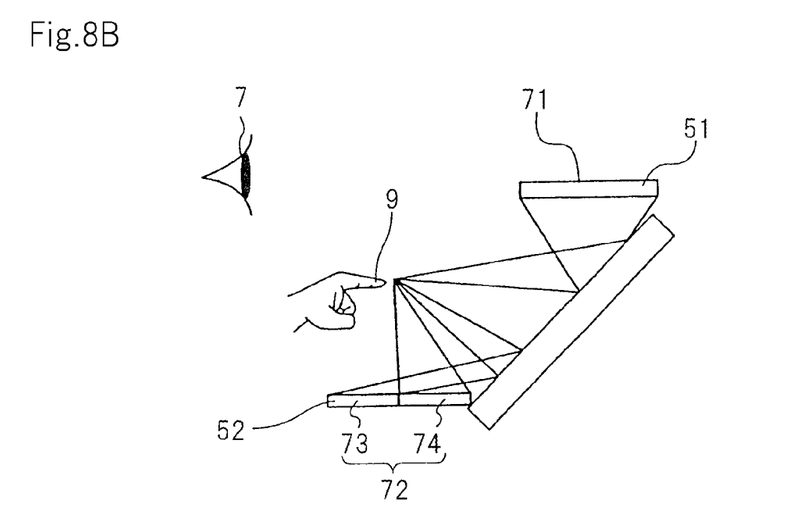
[Fig. 8B] A schematic view showing the three dimensional display device according to the second embodiment.

As shown in FIG. 8B, the generation region of ultrasonic actuator array of second force sense generation unit 52 can be divided into two, namely, first generation region 73 and second generation region 74. In this configuration, an ultrasonic wave to be reflected on display surface 11 of three dimensional image display unit 1 is generated from first generation region 73, and an ultrasonic wave to be directly propagated to fingertip position 9 is generated from second generation region 74. The number of divided generation regions of the ultrasonic actuator array can be set to two or more when necessary.

Figure 8C:
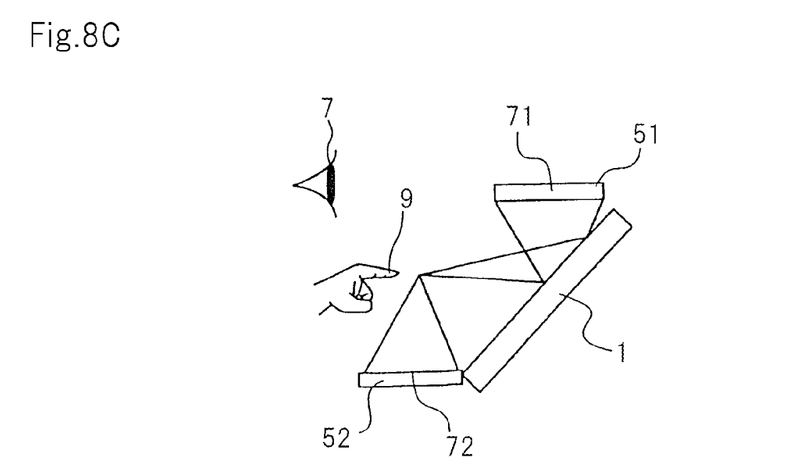
[Fig. 8C] A schematic view showing the three dimensional display device according to the second embodiment.

As shown in FIG. 8C, by setting the propagation direction of the ultrasonic wave generated from ultrasonic actuator array 72 of second force sense generation unit 52 upward that is a vertical direction toward fingertip position 9, a force sense provided upward when fingertip position 9 is moved downward in the vertical direction can be provided. In other words, when three dimensional image 8 is moved downward, a force sense can be generated in the moving direction.

Figure 8D:
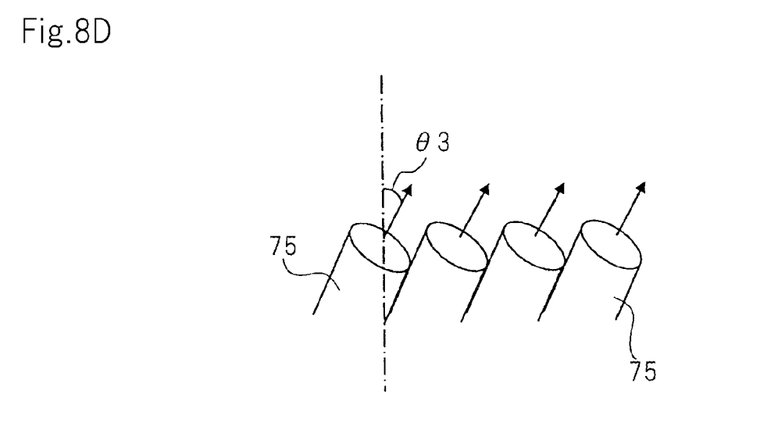
[Fig. 8D] A schematic view showing the three dimensional display device according to the second embodiment.

To generate the inclined wave front of the ultrasonic wave from at least a part of the generation region of the ultrasonic actuator array, as shown in FIG. 8D, a plurality of actuators 75 can be configured beforehand so that the generation direction of the ultrasonic wave from actuator 75 can be inclined by a desired angle of θ3 in a vertical direction orthogonal to the arraying direction of the plurality of actuators 75.

The size of the ultrasonic actuator array, the pitch of the actuators, and the frequency of the ultrasonic wave are not limited to those of this embodiment. They can be appropriately changed when necessary.

Thus, according to the three dimensional display device of the second embodiment, since the ultrasonic image generation space where is produced by first and second force sense generation units 51 and 52 and the three dimensional image generation space for generating three dimensional image 8 which is generated by three dimensional image display unit 1 spatially overlap each other at the same position, the entire three dimensional display device can be miniaturized. According to the second embodiment, the force sense can be provided to the observer's fingertip or the like by the ultrasonic wave parallel to the depth direction of three dimensional image 8. Further, according to the second embodiment, three dimensional image 8 can be changed in the depth direction of three dimensional image 8 according to the observer's fingertip movement, and thus an interactive application can be widely used.

(Third Embodiment)

Figure 9A:
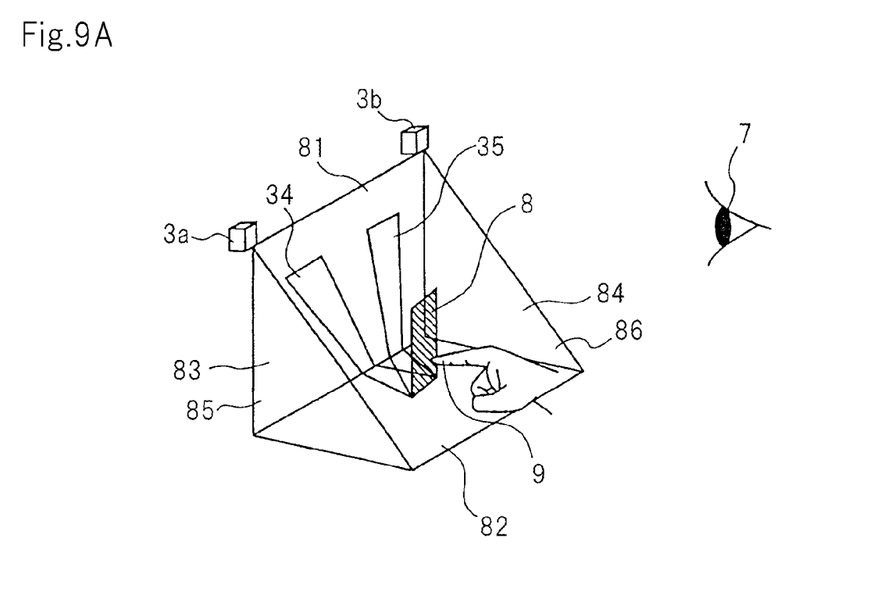
[Fig. 9A] A schematic view showing a three dimensional display device according to a third embodiment.

FIGS. 9A to 9D are schematic views showing a three dimensional display device according to a third embodiment. As shown in FIG. 9A, the three dimensional display device according to the third embodiment includes first and second three dimensional display units 81 and 82 arranged adjacently to each other to form a predetermined inclined angle between display surfaces, and first and second force sense generation units 83 and arranged to face each other by sandwiching the display surfaces of first and second three dimensional image display units 81 and 82.

In the third embodiment, first and second finger position sensors 3a and 3b are arranged on both sides of first three dimensional image display unit 81 in a horizontal direction. The use of first and second finger position sensors 3a and 3b enables detection of fingertip position 9 in a space surrounded with the two display surfaces of first and second three dimensional image display units 81 and 82. As in the case of the first embodiment, the three dimensional display device according to the third embodiment includes finger position detection circuit 4 connected to first and second finger position sensors 3a and 3b, three dimensional image generation circuit 5, and ultrasonic wave generation circuit 6, which are not shown because they are similar to those of the first embodiment.

Three dimensional image display units 81 and 82 are arranged by abutting the end surfaces of outer peripheral portions on each other to form an angle of 90° between the display surfaces. Three dimensional image 8 can be displayed not only in a depth direction but also in a space surrounded with the two display surfaces. In this case, three dimensional image display units 81 and 82 display three dimensional image 8 by displaying a perspective projection transformed image corresponding to observer's viewpoint position 7. FIGS. 9A to 9D schematically show only one eye as observer's viewpoint position 7. However, three dimensional image display units 81 and 82 show perspective projection transformed images corresponding to the respective viewpoint positions of right and left eyes. Observer's fingertip position 9 is measured by finger position sensors 3a and 3b, and detected by finger position detection circuit 4 based on a measuring result.

First force sense generation unit 83 includes ultrasonic actuator array 85. Similarly, second force sense generation unit 84 includes ultrasonic actuator array 86. Ultrasonic actuator arrays 85 and 86 are orthogonal to the display surfaces of three dimensional image display units 81 and 82, having their end surfaces abutted on each other, and arranged on both side faces. Ultrasonic actuator arrays 85 and 86 cause an ultrasonic wave to converge on fingertip position 9 detected by finger position detection circuit 4 to provide a force sense stimulus F to observer's fingertip position 9. Three dimensional image 8 is updated by three dimensional image generation circuit 5 according to the movement of fingertip position 9.

Figure 9B:
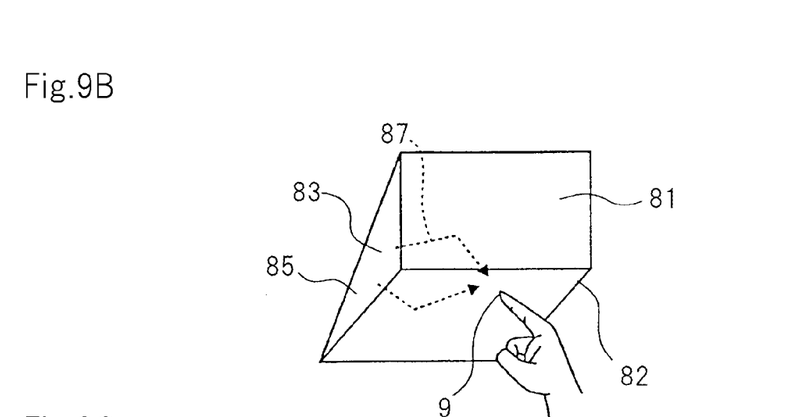
[Fig. 9B] A schematic view showing the three dimensional display device according to the third embodiment.

Ultrasonic actuator arrays 85 and 86 output ultrasonic waves where the inclined wave front shown in FIG. 7A and the phase distribution of a converged wave front by the converged spherical wave shown in FIG. 5A are superimposed. In this case, as shown in FIG. 9B, by setting the propagation direction of the inclined wave front in a direction toward the display surfaces of three dimensional image display units 81 and 82, the ultrasonic waves output from ultrasonic actuator arrays 85 and 86 are regularly reflected on the display surfaces of three dimensional image display units 81 and 82. In other words, the ultrasonic wave reflected on the display surface of three dimensional image display unit 81 is propagated through the path of reflected wave 87 to the position of three dimensional image 8.

Each of ultrasonic actuator arrays 85 and 86 is formed into a right triangle shape having two sides of 200 mm×200 mm orthogonal to each other, in which 25 actuators are arrayed at pitches of 4 mm. Each actuator includes a control circuit that can freely control the pressure amplitude and the phase of the ultrasonic wave generated from ultrasonic wave generation circuit 6, and can provide an arbitrary phase distribution.

Three dimensional image generation circuit 5 includes a digital image processing circuit that generates projection images to the display surfaces of three dimensional image display units 81 and 82 when point of view of the right eye and point of view of the left eye viewpoint of three dimensional image 8 to be displayed are perspective centers.

Right eye perspective projection transformed image 34 and left eye perspective projection transformed image 35 respectively corresponding to point of view of the right eye and point of view of the left eye are alternately arrayed for each pixel in three dimensional image generation circuit 5 in the horizontal direction, three-dimensionally visible by the lenticular lens, and displayed on the color liquid crystal panel that is an image display element.

Under this condition, the images respectively corresponding to points of view of the observer's right eye and left eye are optically provided independently by the lenticular lens, and three dimensional image 8 that is erected in the vertical direction is observed.

As the image display element of each of three dimensional image display units 81 and 82, for example, a color liquid crystal panel having 1280 pixels in the horizontal direction and 960 pixels in the perpendicular direction and a screen size of 300 mm×200 mm is used. In the color liquid crystal panel, the pixels of red, blue and green are arrayed in the perpendicular direction, and a set of these constitutes one pixel (about 235 μm×about 235 μm). A polycarbonate resin is used for the lenticular lens. The lens pitch of the lenticular lens is set to about 470 μm, a cylindrical lens array includes 640 lenses, an optimal viewpoint is set at a position of 600 mm from the centers of the display surfaces of three dimensional image display units 81 and 82 in the depth direction of three dimensional image 8, and a focal distance is set.

The use of the lenticular lenses for three dimensional image display units 81 and 82 enables the observer to view the image three-dimensionally by the naked eyes without wearing any special glasses.

Figure 9C:
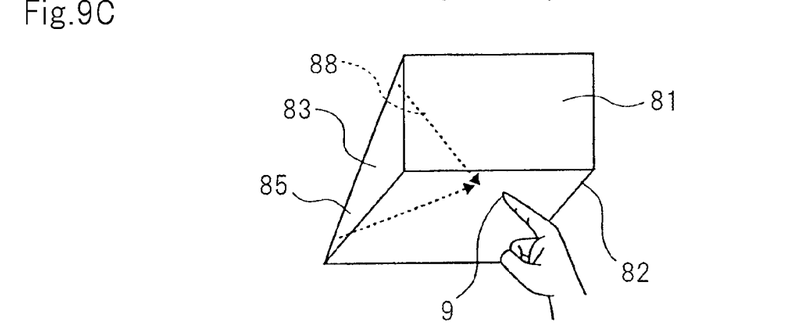
[Fig. 9C] A schematic view showing the three dimensional display device according to the third embodiment.

Further, as shown in FIG. 9C, a force sense can be provided by setting the propagation direction of the ultrasonic wave of ultrasonic actuator array 85 (or ultrasonic actuator array 86) directly toward fingertip position 9 (propagation direction of direct wave 88).

Figure 9D:
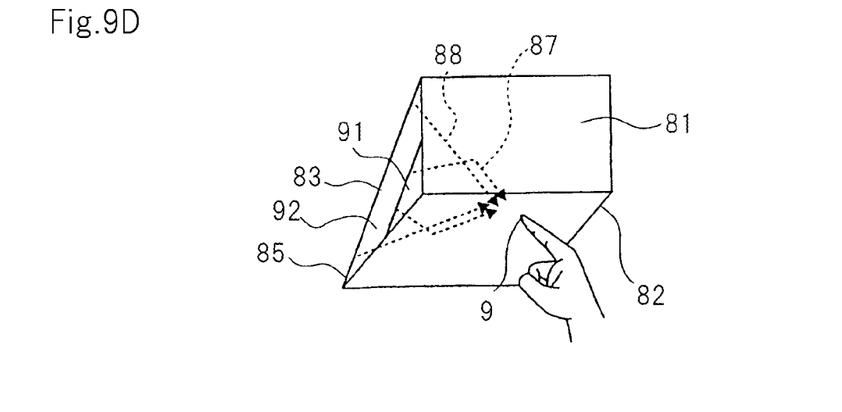
[Fig. 9D] A schematic view showing the three dimensional display device according to the third embodiment.

As shown in FIG. 9D, ultrasonic actuator array 85 (or ultrasonic actuator array 86) can be divided into two, namely, reflected wave region and direct wave region 92, to generate ultrasonic waves reflected on the display surfaces of three dimensional image display units 81 and 82 and an ultrasonic wave directly propagated toward fingertip position 9. The number of divided ultrasonic actuator arrays 85 can be set to any number as long as it is two or more.

In each of ultrasonic actuator arrays 85 and 86, to generate an inclined wave front, as shown in FIG. 8D, an ultrasonic actuator array configured by inclining a plurality of actuators 75 beforehand by an angle of θ3 in a direction orthogonal to the arraying direction of the plurality of actuators 75 can be used.

The sizes of ultrasonic actuator arrays 85 and 86, the pitch of actuators 75, and the frequency are not limited to those of this embodiment. They can be appropriately changed when necessary.

In the third embodiment, finger position sensor 3 carries out triangulation by stereo image measurement. Various optical elements for distance measurement or the like that use a blocking detection light, or a distance measurement element which uses an ultrasonic wave, can be used as finger position sensor 3. In the case of using the optical element for emitting measurement light, light avoiding a visible light region is used as measurement light, or light modulated by a frequency different from an update frequency (refresh rate) for displaying on each of three dimensional image display units 81 and 82 is used. In the case of the distance measurement element using the ultrasonic wave, the ultrasonic wave is set to a frequency different from that of the ultrasonic wave for providing the force sense.

The pitch of the lenticular lens constituting the display surface of each of first and second three dimensional image display units 81 and 82 is about 470 μm, which is smaller than the wavelength 4 mm of the ultrasonic wave. Thus, the convex surface of the lens group of the lenticular lens can be substantially planar with respect to the ultrasonic wave. When necessary, the flatness of the display surface that is an ultrasonic wave reflection surface can be increased by optically disposing a transparent glass or a resin flat plate on the display surface of each of first and second three dimensional image display units 81 and 82.

As an optical system for carrying out three dimensional displaying, for example, a parallax barrier, an integral photography lens array, or a pinhole array can be used, and viewpoint positions can be two or more.

As the image display device, in addition to the color liquid crystal panel, various flat display panels such as an organic EL (electroluminescence) panel, a plasma display panel, a field emission display panel, and electronic paper can be used. As the image display element, a panel having a larger number of pixels and screen size larger than that described above can be used.

Thus, according to the third embodiment, since the ultrasonic image generation space where is produced by first and second force sense generation units 83 and 84 and the three dimensional image generation space for generating three dimensional image 8 which is generated by first and second three dimensional image display units 81 and 82 spatially overlap each other at the same position, the entire three dimensional display device can be miniaturized. According to the third embodiment, the force sense can be provided to the observer's fingertip or the like by the ultrasonic wave in the depth direction of three dimensional image 8. Further, according to the third embodiment, three dimensional image 8 can be changed in the depth direction of three dimensional image 8 according to the observer's fingertip movement, and an interactive application can be widely used.

The shown configuration of each of the foregoing embodiments is only an example, and thus is in no way limitative of the present invention.

The embodiments of the present invention have been described. However, the present invention is not limited to the embodiments. Various changes understandable to those skilled in the art can be made to the configuration and the specifics of the present invention without departing from the scope of the invention.

This application claims priority from Japanese Patent Application No. 2010-165997 filed Jul. 23, 2010, which is hereby incorporated by reference herein in its entirety.

REFERENCE NUMERALS

1 Three dimensional image display unit
2 Force sense generation unit
3 Finger position sensor
7 Viewpoint position
8 Three dimensional position
9 Fingertip position
11 Display surface
20 Ultrasonic wave actuator array
23 Vertical direction
24 Depth direction
31 Point of view of right eye
32 Point of view of left eye
34 Perspective projection transformed image for right eye
35 Perspective projection transformed image for left eye
F Force sense stimulus.

What is claimed is:

1. A three dimensional display device comprising:
    a three dimensional image display unit having a display surface for spatially separating and displaying parallax images corresponding to at least two viewpoints; and
    a force sense generation unit configured to generate a sound wave toward the display surface of the three dimensional display unit and then generate predetermined pressure of the sound wave reflected on the display surface at a position spatially similar to a position of a three dimensional image displayed by the three dimensional display unit.

2. The three dimensional display device according to claim 1, wherein the two force sense generation units are arranged to face each other sandwiching the display surface of the three dimensional image display unit.

3. The three dimensional display device according to claim 1, wherein:
    the two three dimensional image display units are arranged adjacently to each other so that the display surfaces can form a predetermined inclined angle: and the two force sense generation units are arranged to face each other sandwiching the display surface of at least one of the three dimensional image display units.

4. The three dimensional display device according to claim 1, wherein:
the force sense generation unit includes a sound wave actuator array; and
the sound wave actuator array includes a plurality of generation regions, and different wave fronts are reproduced in the plurality of generation regions.

5. The three dimensional display device according to claim 1, wherein:
the force sense generation unit includes a sound wave actuator array; and
the sound wave actuator array includes a first generation region for generating a sound wave toward the display surface of the three dimensional image display unit and propagating the sound wave reflected on the display surface to a position of the three dimensional image, and a second generation region for generating a sound wave directly toward the position of the three dimensional image displayed by the three dimensional image display unit.

6. The three dimensional display device according to claim 4 or 5, wherein the sound wave actuator array has a direction for generating a sound wave from a plurality of sound wave actuators inclined in a direction orthogonal to an arraying direction of the plurality of sound wave actuators.

7. The three dimensional display device according to claim 1, wherein the three dimensional image display unit includes a plurality of image display elements arrayed on a plane, and image processing device for transforming parallax images corresponding to at least the two viewpoints in a perspective projection manner according to positions of the plurality of image display elements.

8. The three dimensional display device according to claim 1, further comprising position detection device for detecting a tactile portion of an observer watching the three dimensional image superimposed on a position of the three dimensional image,
wherein the three dimensional image display unit moves the position of the three dimensional image based on a detection result of the position detection means when the tactile portion moves.

9. The three dimensional display device according to claim 8, wherein the force sense generation unit changes the strength of pressure of the sound wave, when the tactile portion moves, according to the position of the three dimensional image moved by the three dimensional image display unit.

10. A three dimensional display method comprising:
displaying a three dimensional image by spatially separating parallax images corresponding to at least two viewpoints; and
reflecting a sound wave on a display surface for displaying the parallax images, and propagating the sound wave to a position spatially similar to the position of the three dimensional image to generate a force sense.

* * * * *